Aug. 30, 1966

L. E. AUSTIN 3,269,599

BEVERAGE DISPENSER

Filed Oct. 29, 1964

INVENTOR.
LEONARD E. AUSTIN
BY
James L. O'Brien
ATTORNEY

Aug. 30, 1966  L. E. AUSTIN  3,269,599
BEVERAGE DISPENSER
Filed Oct. 29, 1964  5 Sheets-Sheet 2
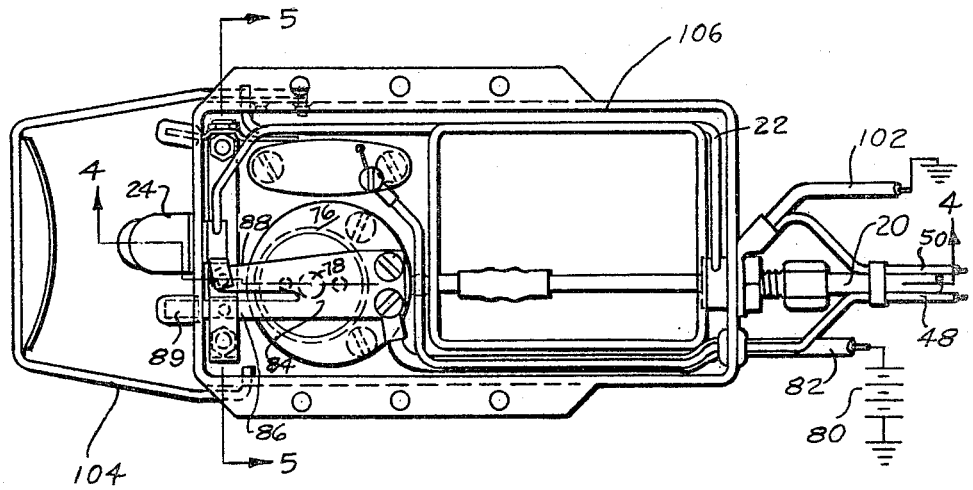
FIG. 3.
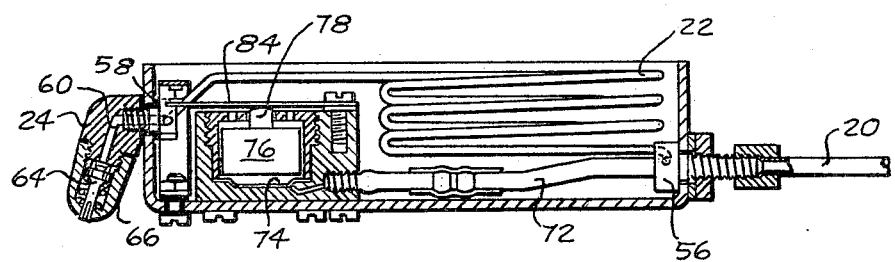
FIG. 4.
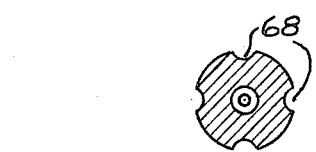
FIG. 7.
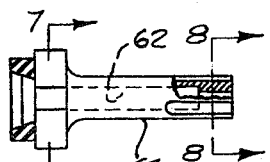
FIG. 6.
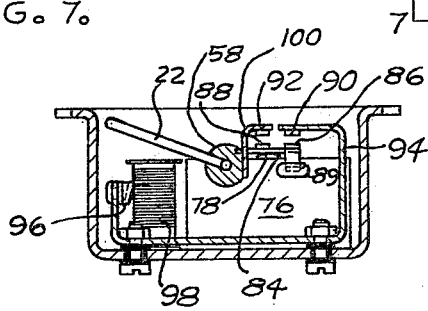
FIG. 8.
FIG. 5.
INVENTOR.
LEONARD E. AUSTIN
BY James L. O'Brien
ATTORNEY

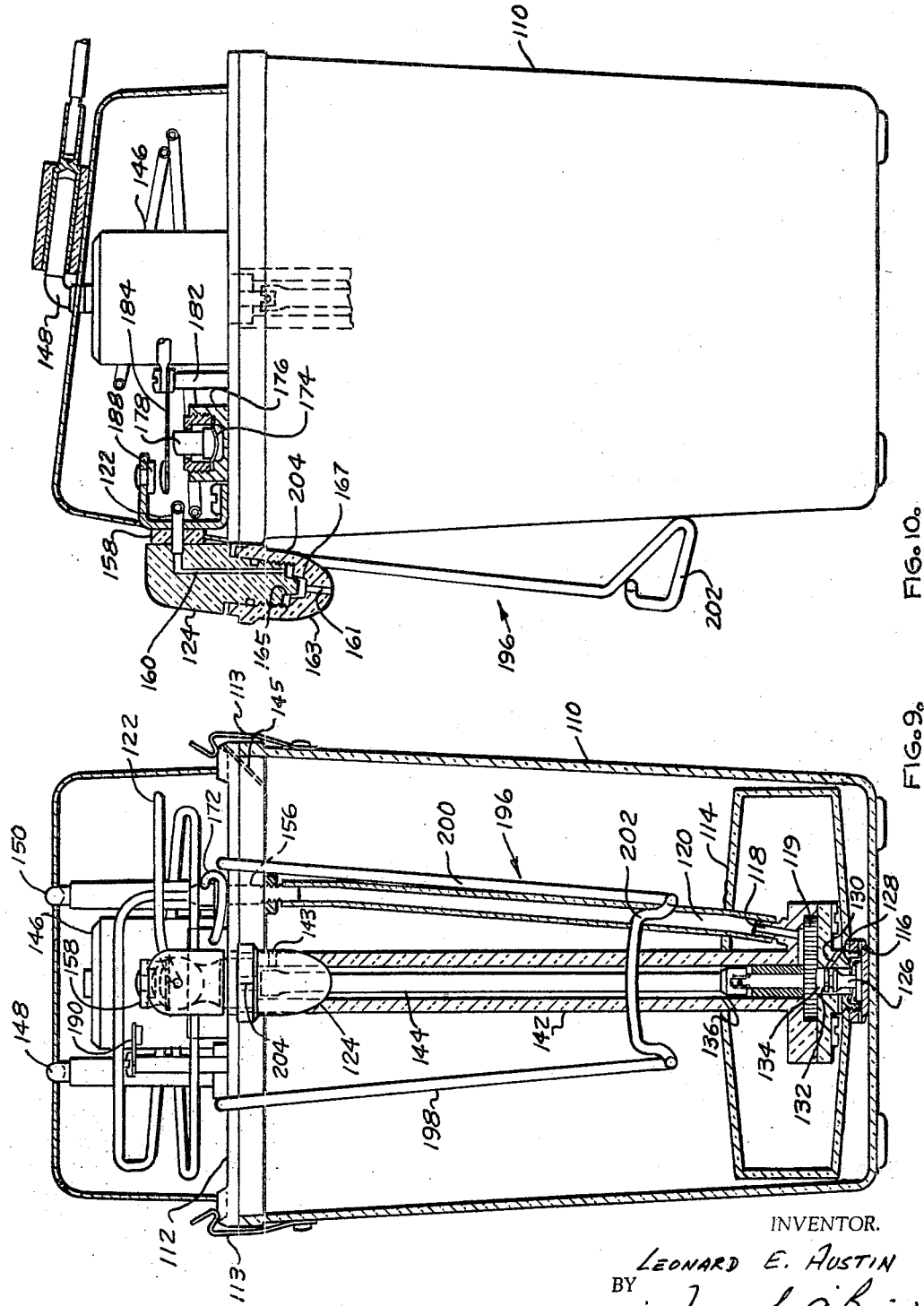

INVENTOR.
LEONARD E. AUSTIN
BY
James L. O'Brien
ATTORNEY

United States Patent Office 3,269,599
Patented August 30, 1966

3,269,599
BEVERAGE DISPENSER
Leonard E. Austin, 512 S. Cortez St., Prescott, Ariz.
Filed Oct. 29, 1964, Ser. No. 407,386
9 Claims. (Cl. 222—63)

The present invention relates generally to beverage dispensers and more particularly to dispensers for dispensing a predetermined quantity of hot liquid.

The beverage dispenser of the present invenion may be used in land, air and marine vehicles as well as in stationary domestic and commercial beverage dispensing applications.

It is an object of the present invention to provide a simple and reliable means for repeatedly measuring a predetermined quantity of liquid and dispensing said liquid.

It is another object of the invention to provide improved means for quickly heating the fluid to be dispensed.

A further object of the invention is to provide a liquid dispenser which is relatively inexpensive to manufacture and which will operate over extended periods with little or no maintenance.

These and other objects and advantages of the present invention will become readily apparent from the following detailed descrption taken in connection with the following drawings in which:

FIGURE 3 is a top view of the heater and discharge portion of the dispenser;

FIGURE 4 is a sectional view taken along line 4—4 of FIGURE 3;

FIGURE 5 is a sectional view taken along line 5—5 of FIGURE 3;

FIGURE 6 is an enlarged view of the nozzle valve shown in FIGURE 4;

Figure 11:
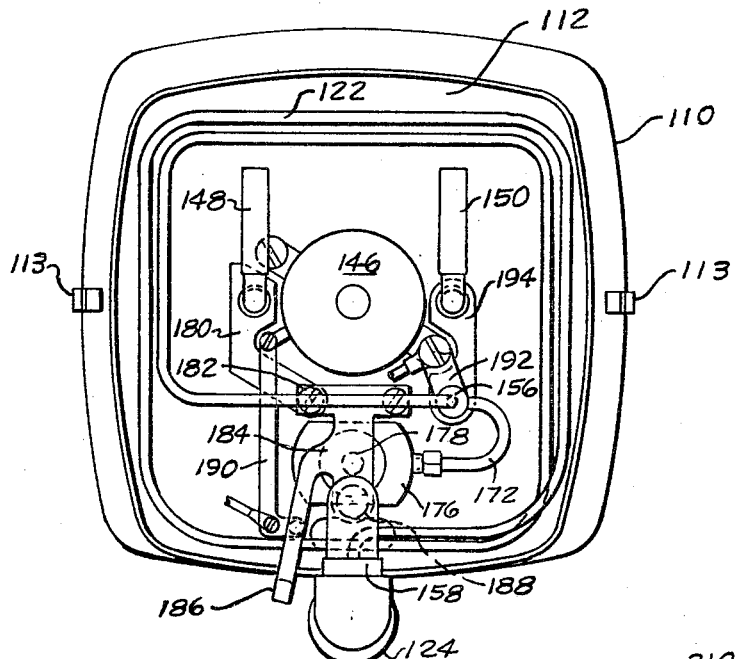
Figure 13:
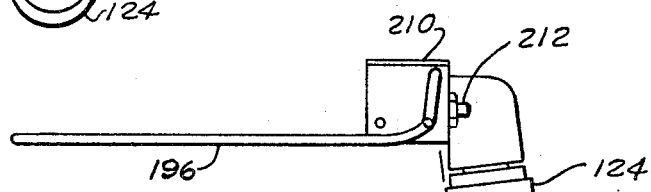
Figure 12:
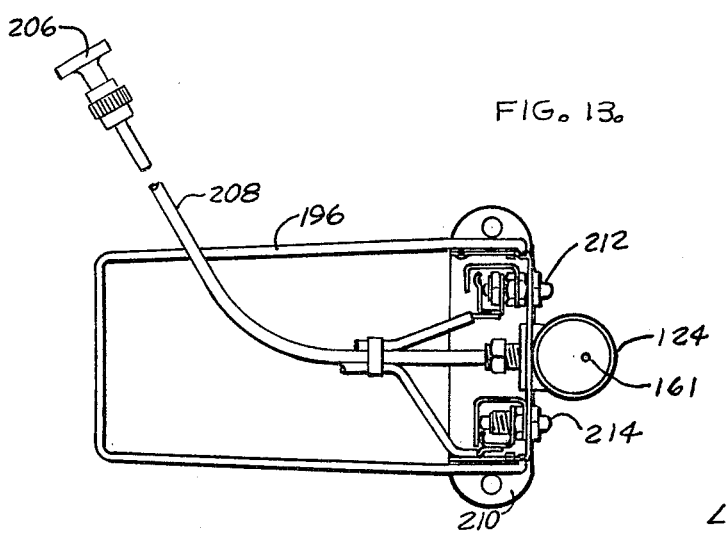

FIGURES 7 and 8 are sectional views taken along lines 7—7 and 8—8 respectively of FIGURE 6;

FIGURE 9 is the front view partially in section of another embodiment of the present invention;

FIGURE 10 is a side view partially in section of the dispenser shown in FIGURE 9;

FIGURE 11 is a top view of the dispenser shown in FIGURE 9;

FIGURE 12 is a bottom view of a remote control and discharge unit which can be used in place of the control and discharge nozzle shown in FIGURES 9, 10 and 11;

FIGURE 13 is a side view of the unit shown in FIGURE 12; and

Figure 14:
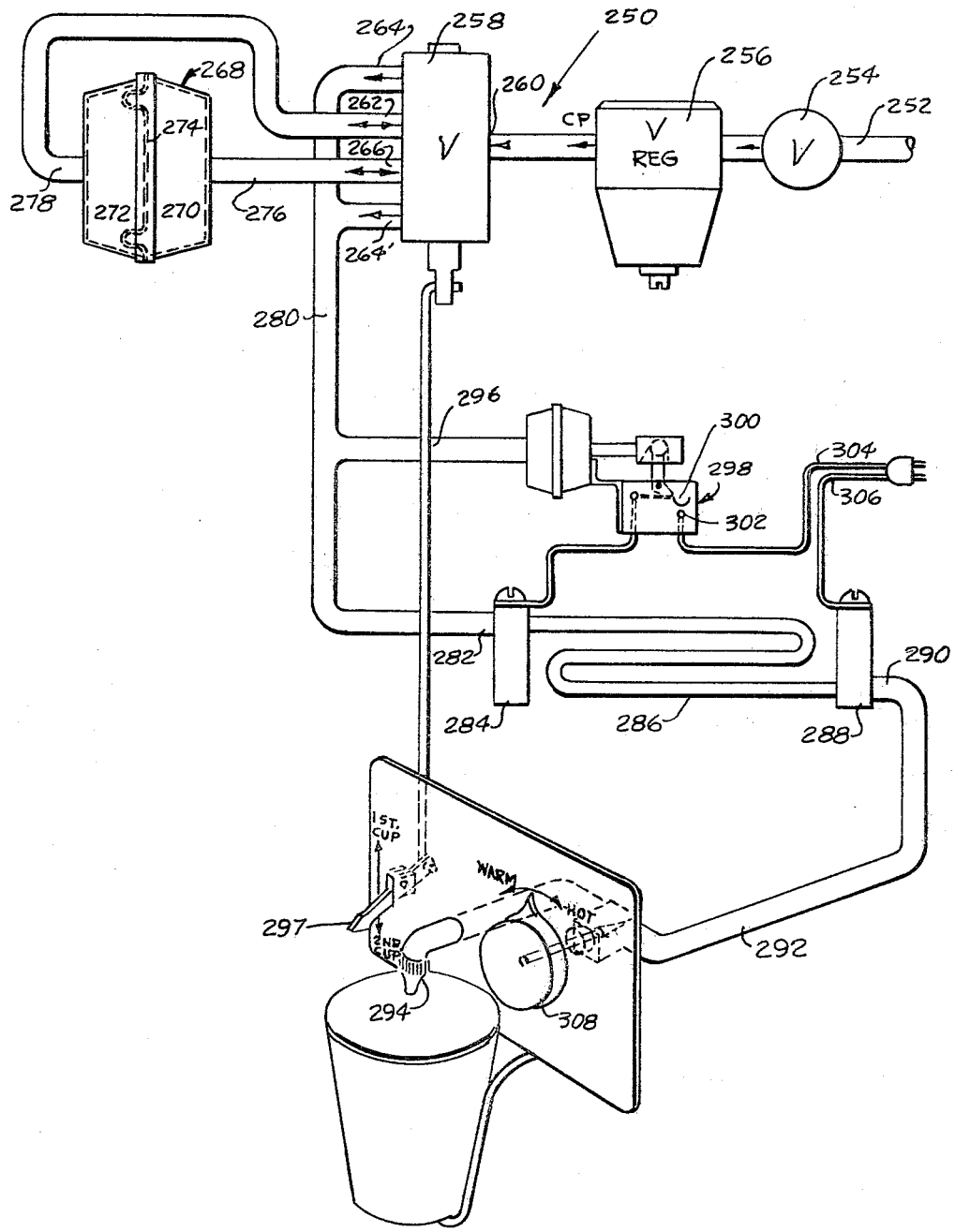

FIGURE 14 is a schematic view of still another embodiment of the present invention.

Figure 1:
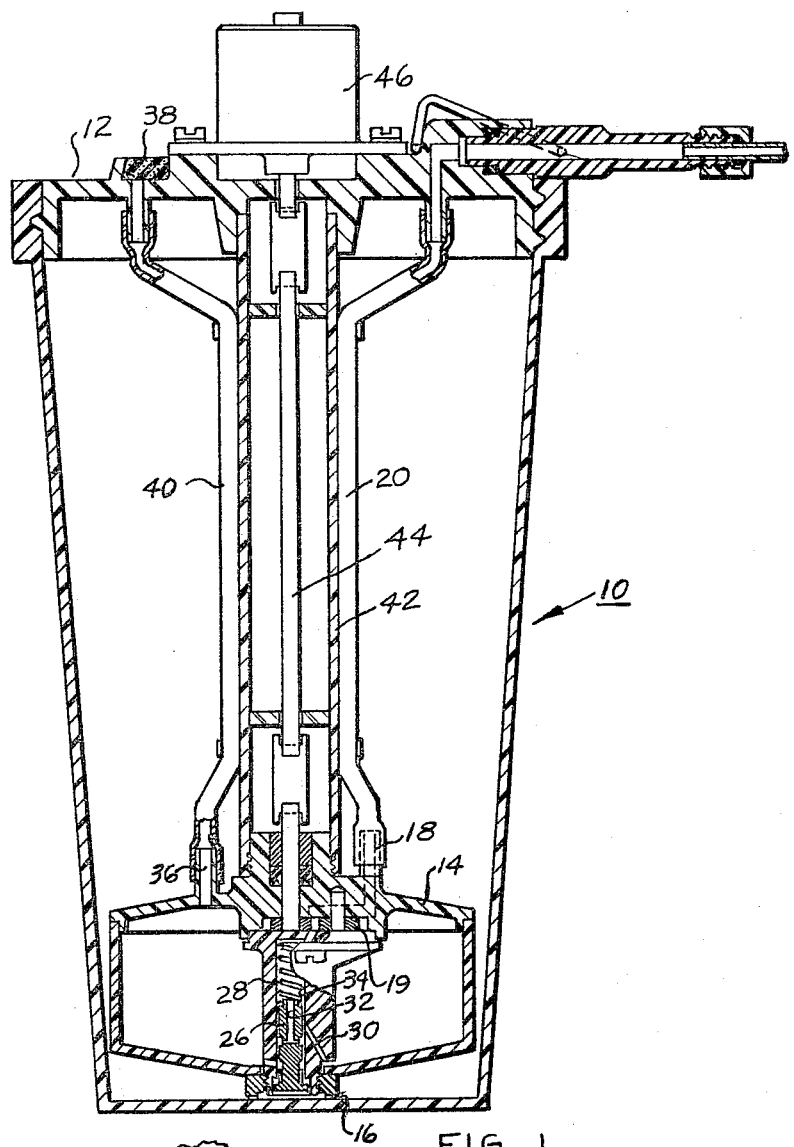
FIGURE 1 is a sectional view showing the reservoir portion of a liquid dispenser embodying the present invention.
Figure 2:
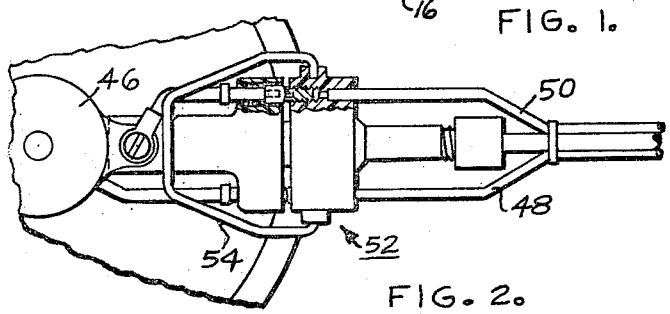
FIGURE 2 is a fragmentary view of the top of the dispenser shown in FIGURE 1.

Referring to the drawings and more particularly to FIGURE 1, numeral 10 designates a reservoir or source of liquid having a cover 12 threadedly received in the top thereof. Disposed within the the reservoir 10 is a measuring chamber 14 having a predetermined volume. The measuring chamber 14 is provided with an inlet 16 in communication with the reservoir 10 and an outlet 18. A gear pump 19 disposed within chamber 14 pumps liquid under pressure from chamber 14 through outlet 18, conduit 20, tube means 22 (FIGURES 3 and 4) to discharge nozzle 24. Inlet 16 is controlled by a pressure responsive valve 26 which is urged toward open position by a spring 28 and toward closed position by the pressure differential between the pressure at inlet 16 and the pressure in cylinder 34. When the valve 26 is in closed position, chamber 14 is brought into communication with outlet 18 via conduit 30, passage 32 in valve 26, cylinder 34 and pump 19. Chamber 14 is provided with a vent 36 which is connected to an air filter 38 in cover 12 by means of a conduit 40.

The measuring chamber 14 is suspended from cover 12 by means of a column 42 through which a drive shaft 44 extends. One end of drive shaft 44 is connected to pump 19 and the other end to an electric motor 46. Motor 46 is provided with current through leads 48 and 50. A coupling 52 secured in place by a bail 54 is provided to permit the leads 48 and 50 of conduit 20 to be broken.

As best seen in FIGURES 3 and 4, liquid from conduit 20 enters an electrically insulated block 56 from which it passes through an electrically conductive tube 22, to a second insulated block 58 and from thence via passage 60 in nozzle 24 through passage 62 in spring loaded valve 64 disposed in nozzle cap 66. As best seen in FIGURES 6-8 valve 64 is fluted as at 68 and 70 such that in the event passage 62 becomes clogged pressure in passage 60 would force valve 64 outwardly whereby fluid would pass into the cavity of cap 66 and through the flutes 68 and 70 for ultimate discharge from the nozzle.

As best seen in FIGURE 4, a passage 72 conducts liquid from block 56 to one side of a movable wall 74 in pressure responsive switch 76 from which a plunger 78 projects. A source of electric power 80 is connected by means of lead 82 to a switch blade 84 which is adapted to be engaged on its underside by plunger 78 and which is provided with forked arms 86 and 88. Arm 86 is provided with a handle 89 which may be moved manually upwardly to bring arm 86 into engagement with contact 90. Engagement of arm 86 with contact 90 closes the electric motor circuit by connecting the source of power 80 via lead 82, arm 86, contact 90, bracket 94, wiper arm 96, rheostat 98 and lead 48. The amount of current flowing to the motor 46 may be controlled by manual adjustment of the wiper 96 which controls the speed of the motor 46 and the pump 19 driven thereby. The engagement of arm 88 with contact 92 closes the circuit to cause current to flow in electrically conducting tube 22 by connecting the source of power 80 via lead 82, arm 88, contact 92, bracket 100 to one end of tube 22. The other end of tube 22 is connected by means of lead 102 to ground or reference potential.

A bail 104 is pivotally mounted on dispenser housing 106 to retain a cup adapted to receive the beverage to be dispensed.

In the operation of the device shown so far, the reservoir 10 is filled with a liquid which is permitted to fill the measuring chamber 14 through the normally open inlet 16. When the manual switch arm 89 is moved upwardly to close the contacts, the pump 19 is energized to cause liquid from measuring chamber 14 to be discharged therefrom to outlet 18 and conduit 20. The energization of the pump 19 causes a pressure drop between inlet 16 and the interior of cylinder 34 sufficient to cause the pressure responsive inlet valve 26 to close. As soon as liquid under pressure from conduit 20 has passed through conduit 72 to urge diaphragm 74 upwardly, the plunger 78 of pressure responsive switch 76 also moves upwardly to hold the arms 86 and 88 into engagement with their respective contacts for so long as pressure exists in conduit 72. When the measuring chamber 14 has been substantially emptied, the pressure in conduit 72 will drop causing the plunger 78 to retract and the contacts to be opened in both the motor and heater circuits. The walls of the tube 22 are heated by the current flowing therethrough and this heat is transferred to the fluid flowing through the tube. The temperature of the water may be controlled by regulating the wiper 96 to control the speed and thus the rate at which liquid flows through the tube.

Referring now to the embodiment shown in FIGURE 9, numeral 110 designates a reservoir or source of liquid having a cover 112 held in place by clips 113. Disposed within reservoir 110 is a measuring chamber 114 of predetermined volume having an inlet 116 and an outlet 118. A gear pump 119 disposed within chamber 114 discharges liquid under pressure from chamber 114, conduit 120, tube means 122 to discharge nozzle 124. Inlet 116 opens into reservoir 110 and is controlled by a pressure responsive valve 126 which is urged toward open position by a spring 128 and is urged toward closed position by the pressure differential between the pressure at inlet 116 and pressure in cylinder 134. When the valve 126 is in closed position, chamber 114 is brought into communication with outlet 118 via conduit 130, passage 132 in valve 126, cylinder 134 and pump 119. The measuring chamber 114 is suspended from cover 112 by means of a column 142. A vent 136 connects chamber 114 with the interior of column 142. Vent 143 connects the interior of column 142 with reservoir 110 near the top thereof whereas vent 145 in cover 112 connects the reservoir 110 to the atmosphere. A drive shaft 144 extends through column 142 and at one end is connected to pump 119 and at the other end to an electric motor 146 having current leads 148 and 150 which are adapted to be connected to a source of electric power.

Liquid from conduit 120 enters an electrically insulated coupling 156 from which it passes through electrically conducting tube 122 to a second insulated coupling 158 thence via passage 160 in nozzle 124 and discharge orifice 161 in nozzle cap 163. As best seen in FIGURE 10, a tapered valve member 165 depends from nozzle body 124 and is adapted to coact with a seat 167 in cap 163 to determine the flow discharge area. Cap 163 is threadedly mounted on nozzle body 124 whereby rotation of cap 163 moves the seat 167 axially to regulate the flow area.

As best seen in FIGURE 11, a passage 172 conducts liquid from coupling 156 to one side of movable wall 174 in pressure responsive switch means 176 from which a plunger 178 projects. Current lead 148 is connected by means of strap 180 and post 182 to a switch blade 184 which is adapted to be engaged on its under side by plunger 178 and which is provided with a manually actuable lever arm 186. Arm 186 may be lifted upwardly to bring switch blade 184 into engagement with contact 188 which closes the heater and motor circuits. The motor circuit comprises lead 148, strap 180, post 182, blade 184, strap 190, motor 146, straps 192 and 194 to lead 150. The walls of the tube 122 constitute the heater. One end of tube 122 is connected to strap 158, as best seen in FIGURE 10, whereas the other end of tube 122 is connected to strap 194, as best seen in FIGURE 11.

A bail 196 having a pair of arms 198 and 200 connected at the bottom by a transverse member 202 is mounted on cover 112. The arms 198 and 200 are spaced along an arc at approximately equal distances from a midpoint 204 on the periphery of nozzle 124. The arrangement is such that the rim of a cup adapted to receive the beverage to be dispensed may be held in place by engagement of the interior of the nozzle 124 with the cup and the engagement of the arms 198 and 200 with the exterior wall of the cup. The transverse member, of course, being adapted for engagement with the bottom of the cup.

In operation, lifting the arm 186 to close the contact energizes the motor. The pump pressure in 172 acting on wall 174 actuates the pressure responsive switch 176 to maintain the motor and close the heater contacts thus maintaining them in energized state so long as pump pressure exists sufficient to hold the plunger 178 in its extreme upper position. Upon energization of the pump a pressure differential is created across valve 126 sufficient to close inlet 116 of measuring chamber 114. When pump 119 has discharged substantially all of the liquid from chamber 114, the pressure in passage 172 will drop and switch 176 will open contact 184–190 then 184 and 158 causing the motor and heater to be deenergized. The valve 126 will open allowing the chamber 114 to fill thus placing the dispenser in readiness for another cycle.

The temperature of the liquid dispensed may be controlled by rotating nozzle cap 163 to vary the flow discharge area.

As best seen in FIGURES 12 and 13, the discharge nozzle and electric control may be located in a member remote from the reservoir 110. A coupling 206 is adapted to be fastened to nozzle bracket 158 in place of nozzle 124 and liquid conveyed via conduit 208 to nozzle 124 which is now located on housing 210. A switch 212 is connected in the circuit of motor 146 in such a manner as to cause motor 146 to be energized when the switch 212 is closed. Once the motor is energized the pressure responsive switch 176 holds the motor and heater circuits energized as described with respect to the previous embodiment. A switch 214 mounted on housing 210 is provided to abort a dispensing cycle any time switch 214 is actuated. Switch 214 opens the motor and heater circuits.

Referring now to the embodiment shown in FIGURE 14, a dispenser designated generally by the numeral 250 is adapted to receive liquid under pressure from a suitable source (not shown) via inlet pipe 252 which is provided with a shut-off valve 254 and an adjustable pressure regulator valve 256. Liquid from regulator 256 flows to a manually actuatable 4-way valve 258 having an inlet 260 and ports 262, 264 and 266. In a first position of valve 258 liquid from valve inlet 260 is directed through ports 266 or 262 to reservoir 268 which is divided into first and second chambers 270 and 272 by a pressure responsive movable wall 274. Liquid from port 266 passes through conduit 276 into chamber 270 to urge wall 274 to the left so as to discharge liquid from chamber 272 through conduit 278, ports 262, 264, passage 280, insulated inlet 282, block 284, tube means 286, block 288, insulated outlet 290, conduit 292 to discharge nozzle 294. Actuation of manual lever means 297 reverses the 4-way valve 258 such that liquid now flows from inlet 260, port 262, conduit 278 to chamber 272 to urge movable wall 274 to the right to discharge liquid from chamber 270, conduit 276, ports 266, 264', passage 280 and thence to nozzle 294 as described above. At the beginning of a cycle the movable wall 274 will be at one of its extreme positions in which one of the chambers 270, 272 will be substantially empty and the other substantially full. The chambers have a predetermined volume such that a predetermined quantity of liquid will be discharged when the wall 274 moves from one of its extreme positions to another.

A branch conduit 296 connects a pressure responsive switch 298 with passage 280. Switch 298 in response to pressure in passage 280 closes contacts 300, 302 to connect one end of tube 286 to an electric lead 304. The other end of tube 286 being connected to electric lead 306 through block 288. The leads 304 and 306 are adapted to be connected to a source of power (not shown). The tube 286 may be directly connected to leads 304 and 306 as shown; or may be coupled as the secondary winding to the primary of a transformer to which leads 304, 306 would then be connected.

The flow area may be controlled by nozzle 294 as previously described or a separate valve means 308 may be provided in conduit 292 for that purpose. It will be understood that when the liquid has been dispensed from a particular chamber 270, 272 the pressure in conduit 280 will drop causing switch 298 to open contacts 300, 302 thereby turning off the current in tube 286.

Although my invention has been shown and described with reference to specific embodiments thereof, it will be readily apparent to those skilled in the art that various changes and modifications may be made without departing from the spirit of my invention.

I claim:

1. A beverage dispenser having a source of liquid comprising:

a measuring chamber having a predetermined volume, an inlet and an outlet for said chamber, means adapted to connect said inlet to said source, conduit means connected at one end to said outlet, a first electrically insulated coupling connected to the other end of said conduit means, an electrically conducting tube connected at one end to said first coupling to be in flow communication with said conduit means, a second electrically insulated coupling connected to the other end of said tube, a discharge nozzle connected to said second coupling, electric circuit means operatively connected to said tube for causing an electric current to flow therethrough, a normally open switch in said circuit responsive to the pressure in said conduit means to move to closed position, and pumping means energizable to discharge the liquid from said chamber.

2. A beverage dispenser having a source of liquid comprising:

a measuring chamber having a predetermined volume, an inlet and an outlet for said chamber, valve means adapted in one position to connect said inlet to said source and in a second position to prevent communication between said inlet and said source, an electrically conducting tube, a first electrically insulated coupling means adapted to connect one end of said tube to said outlet, a discharge nozzle, a second electricallly insulated coupling means adapted to connect the other end of said tube to said nozzle, means for causing an electric current to flow through said tube, switch means responsive to the pressure in said outlet for controlling said last mentioned means, and pump means energizable to discharge the liquid from said chamber.

3. The dispenser of claim 2 wherein the nozzle is provided with a body having a threaded end, a tapered projection depending from said body, a cap threadedly received on said body and having a tapered seat portion adapted to receive said projection, said seat portion being movable axially relatively to said projection to adjustably determine the discharge area of said nozzle, and a discharge orifice in said cap in communication with said seat portion.

4. A beverage dispenser having a source of liquid comprising:

a chamber having an inlet connected to said source, a discharge nozzle, an outlet for said chamber, conduit means connecting said outlet to said nozzle, an electrically conducting tube forming part of said conduit means for conducting liquid from said outlet to said nozzle, means for electrically insulating said tube from the remainder of said conduit means, electric means connected to said tube for causing an electric current to flow therethrough, and means responsive to the liquid pressure in said conduit means for controlling said electric means.

5. A beverage dispenser having a source of liquid comprising:

a measuring chamber having a predetermined volume, an inlet and an outlet for said chamber, a discharge nozzle, conduit means connecting said outlet to said nozzle, a pump in said chamber adapted to discharge liquid through said outlet, means for energizing said pump, pressure responsive means operatively connected to said conduit means for deenergizing said pump when the pressure in said conduit means falls below a predetermined value, means connecting said inlet to said source, and normally open pressure responsive valve means controlling said inlet, said valve means being moved to closed position in response to a predetermined pressure differential between said source and said chamber.

6. In a beverage dispenser, a mounting member, a discharge nozzle projecting downwardly from said member, and a bail having a pair of arms connected by a transverse member pivotally mounted on said member, said arms being arcuately spaced an equal distance from a point on the periphery of said nozzle whereby the rim of a vessel to receive the dispensed beverage may be held in place on the bail by the engagement of the nozzle with the interior of the vessel and the engagement of the arms with the exterior of the vessel.

7. A beverage dispenser having a source of liquid comprising: a measuring chamber having a predetermined volume, an inlet for said chamber in communication with said source, an outlet for said chamber, a discharge nozzle, conduit means connecting said outlet with said nozzle, an electrically driven pump energizable to discharge liquid from said chamber through said outlet, manually actuable switch means to energize said pump, pressure responsive means responsive to the pressure in said conduit means for holding said pump in energized condition when the pressure in said conduit means exceeds a predetermined value, and a pressure responsive valve controlling said inlet and being moved to closed position in response to the pressure differential across said inlet when said pump is discharging liquid from said chamber.

8. The beverage dispenser of claim 7 having manual means for controlling the speed of said pump and thereby the rate liquid is discharged from said chamber.

9. The beverage dispenser of claim 7 having means for controlling the cross sectional flow area of said conduit means.

References Cited by the Examiner

UNITED STATES PATENTS

| | | | |
|---|---|---|---|
| 1,050,731 | 1/1913 | Freese | 222—250 X |
| 1,122,270 | 12/1914 | Goehring | 222—249 |
| 1,457,634 | 6/1923 | Neri | 222—146 |
| 1,575,152 | 3/1926 | Di Battista | 222—146 |
| 2,757,846 | 8/1956 | Varrin | 222—250 X |
| 2,851,197 | 9/1958 | Colton | 222—146 X |
| 2,880,909 | 4/1959 | Clymer et al. | 222—63 X |

M. HENSON WOOD, JR., *Primary Examiner.*

HADD S. LANE, LOUIS J. DEMBO, *Examiners.*